United States Patent
Lee et al.

(10) Patent No.: US 7,751,414 B2
(45) Date of Patent: Jul. 6, 2010

(54) BRIDGE FOR HETEROGENEOUS QOS NETWORKS

(75) Inventors: Kwang Il Lee, Daejeon (KR); Dong Hwan Park, Daegu (KR); Jun Hee Park, Daejeon (KR); Chae Kyu Kim, Daejeon (KR); Kyeong Deok Moon, Daejeon (KR); Yong Seok Jeong, Gyounggi-do (KR); Young Wook Lee, Gyounggi-do (KR); Duck Ki Ahn, Gyounggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 11/857,837

(22) Filed: Sep. 19, 2007

(65) Prior Publication Data
US 2008/0080534 A1    Apr. 3, 2008

(30) Foreign Application Priority Data
Sep. 29, 2006   (KR) ...................... 10-2006-0096419

(51) Int. Cl.
*H04L 12/28* (2006.01)
*H04L 12/56* (2006.01)
(52) U.S. Cl. ..................................... 370/401
(58) Field of Classification Search ........................ None
See application file for complete search history.

(56) References Cited

U.S. PATENT DOCUMENTS

| 7,142,563 | B1* | 11/2006 | Lin ........................... 370/469 |
| 7,555,543 | B2* | 6/2009 | Encarnacion et al. ....... 709/223 |
| 2002/0022455 | A1 | 2/2002 | Salokannel et al. ........... 455/68 |
| 2004/0057437 | A1 | 3/2004 | Daniel et al. |
| 2004/0066789 | A1* | 4/2004 | Kobayashi .................. 370/402 |
| 2005/0116814 | A1* | 6/2005 | Rodgers et al. ......... 340/310.01 |
| 2006/0168126 | A1* | 7/2006 | Costa-Requena et al. ... 709/219 |
| 2007/0053352 | A1* | 3/2007 | Corcoran .................... 370/389 |
| 2007/0286074 | A1* | 12/2007 | Xu ............................. 370/230 |

FOREIGN PATENT DOCUMENTS

| KR | 1020030043649 | 6/2003 |
| KR | 1020030056304 | 7/2003 |
| KR | 1020040066298 | 7/2004 |

OTHER PUBLICATIONS

Hlasny et al, "UPnP QoS Architecture 1.0", Mar. 10, 2005, UPNP Forum.*

* cited by examiner

*Primary Examiner*—Chirag G Shah
*Assistant Examiner*—Jenkey Van
(74) *Attorney, Agent, or Firm*—Ladas & Parry LLP

(57) ABSTRACT

A bridge for heterogeneous QoS networks is provided. The bridge comprises an UPnP QoS processing unit, a bridge function unit and at least two of network drive drivers. The UPnP QoS processing unit collects connection information connected through the networks and QoS requirement information thereof through an UPnP QoS structure. The bridge function unit establishes and releases connection by allocating resources based on the collected connection information and QoS requirement information, and performs a bridging operation according to connection information of a received frame. At least two of network device drivers are physically connected to the networks.

5 Claims, 6 Drawing Sheets

BRIDGE FOR HETEROGENEOUS QOS NETWORKS

CLAIM OF PRIORITY

This application claims the benefit of Korean Patent Application No. 10-2006-96419 filed on Sep. 29, 2006 in the Korean Intellectual Property Office, the disclosure of which is incorporated herein by reference.

BACKGROUND OF THE INVENTION

1. Field of the Invention

The present invention relates to a bridge for heterogeneous QoS networks, and more particularly, to a bridge for heterogeneous QoS networks, which can provide QoS required by all application services using a universal plug and play (UPnP) QoS structure.

2. Description of the Related Art

As a home network technology has been advanced, a demand of multimedia services for transmitting/receiving not only simple text but also audio/video data has increased abruptly. In order to provide the multimedia service, it requires sufficient bandwidth in a home network and a method for providing various service requirements for multimedia service in a network.

A universal plug and play (UPnP) is a representative home network middleware for providing various audio/video (NV) services. The UPnP is driven based on IP networking, and the structure thereof is defined using widely used protocols in the Internet such as a transmission control protocol (TCP), a user datagram protocol (UDP), a hyper text transfer protocol (HTTP), and an extensible markup language (XML). The object of UPnP is to provide a seamless network between devices using various mediums in a home network, and not require a user's or a manager's efforts when a device is added or removed to/from a network. Particularly, UPnP QoS structure provides a method for exchanging connection information and graphic characteristics of a service so as to provide QoS of application service to devices controlled through the UPnP.

Furthermore, various network technologies have been introduced for providing multimedia service in a home network. Homeplug AV (HPAV) using a high speed power line and WiNET using wireless signal are representative technologies among them.

The HPAV is the next generation standard technology of HomePlug Power line Alliance, which provides high quality, multistream and home entertainment environment through a power line in a house. The HPAV employs an enhanced physical layer technology and a MAC layer technology for providing 200 Mbps level power line network. Particularly, the MAC layer provides a Carrier Sense Multiple Access (CSMA) and a Time Division Multiple Access (TDMA) that guarantees bandwidth reservation, high reliability, strict control of delay time and jitter.

On the contrary, the WiNET is a sub layer of a WiMedia network protocol, and is a protocol adaptation layer (PAL) of a WiMedia wireless platform to be operated as Ethernet or IEEE 802.3. The WiNET allows a home network to be transformed to a wireless personal area network (WPAN) without modifying a typical TCP/IP application program. The WiNET provides a link layer service for an upper layer protocol such as IPv4 or IPv6, and uses services provided from a WiMedia wireless platform for transmitting and receiving PDU. Supplementary, the WiNET provides an asynchronous broadcast transmission scheme and a multicast PDU for saving power consumption of a device operated based on battery power, and guarantees QoS using TSPEC using UPnP or RSVP. The WiMedia wireless platform is a WPAN structure that includes WiMedia PHY/MAC, WiMedia Multiplexing (WiMUX), and WiMedia MAC Convergence Architecture (WiMCA).

FIG. 1 is a block diagram illustrating a general structure of a home network bridge connecting a wireless network and a wired network such as HPAV and WiNET according to the related art.

As shown in FIG. 1, the conventional bridge apparatus for a typical home network includes a bridge function unit 31 for performing a bridge function to data communication between a first network and a second network, a first network device driver 32 connected to the first network for performing operations to communicate through the first network, and a second network device driver 33 connected to the second network for performing operations to communicate through the second network. The bridge function unit 31 receives data frames through the first and second network device drivers 32 and 33, decides a destination network based on a second layer address of a destination, transforms the received data frames to have a format suitable to the decided destination network, and instructs a corresponding network device driver 32 or 33 to transmit the transformed data frame.

In a home network, the first network may be a wired network, for example, a power line communication (PLC) network, and the second network may be networks different from the PLC network, for example, a wireless network. More particularly, the second network may be a WiNET.

In case of the bridge according to the related art, the bridge only has information about the second layer and does not have information about connection defined in the application layer and QoS information. Therefore, a transmitter is allowed to transmit all frames to destination thereof but cannot satisfy the QoS requirements required by the user.

In order to satisfy the QoS requirements, the bridge must detect the characteristics of each application service and provides the QoS according to the detected characteristics thereof.

Since the two different networks connected through the bridge provide different QoS mechanisms, the heterogeneity problem of a QoS is required to solve for guaranteeing QoS between ends stations and for stably providing QoS.

SUMMARY OF THE INVENTION

The present invention has been made to solve the foregoing problems of the prior art and it is therefore an object according to certain embodiments of the present invention is to provide a bridge for heterogeneous QoS network, which can bridge networks having different QoS characteristics and provide QoS required for services using a UPnP QoS structure.

According to an aspect of the invention for realizing the object, there is provided a bridge for heterogeneous QoS networks including: an UPnP QoS processing unit for collecting connection information connected through the networks and QoS requirement information thereof through an UPnP (Universal Plug and Play) QoS (Quality of service) structure; a bridge function unit for establishing and releasing connection by allocating resources based on the collected connection information and QoS requirement information, and performing a bridging operation according to connection information of a received frame; and at least two of network device drivers physically connected to the networks for receiving data from a corresponding network and transferring the received data to the bridge function unit, or transmitting data from the bridge function unit to a corresponding network.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
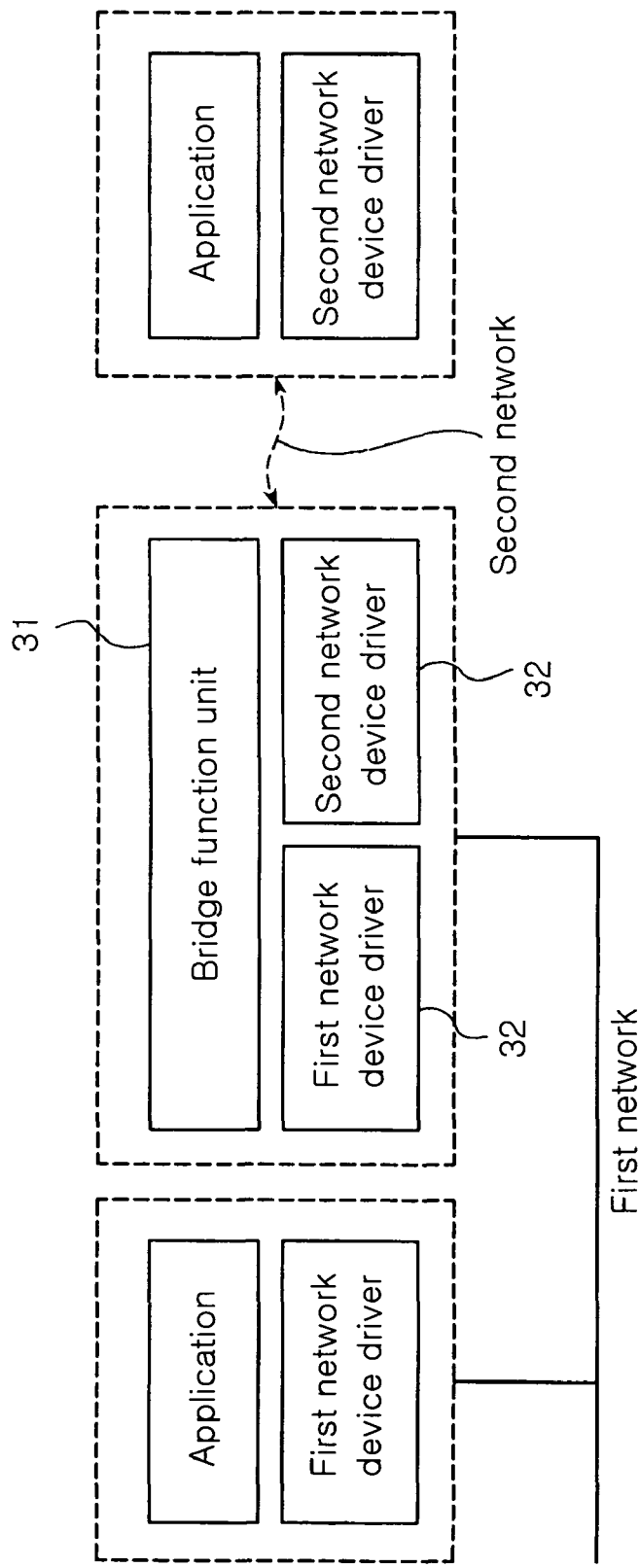
FIG. 1 is a block diagram illustrating a bridge according to the related art.
Figure 2:
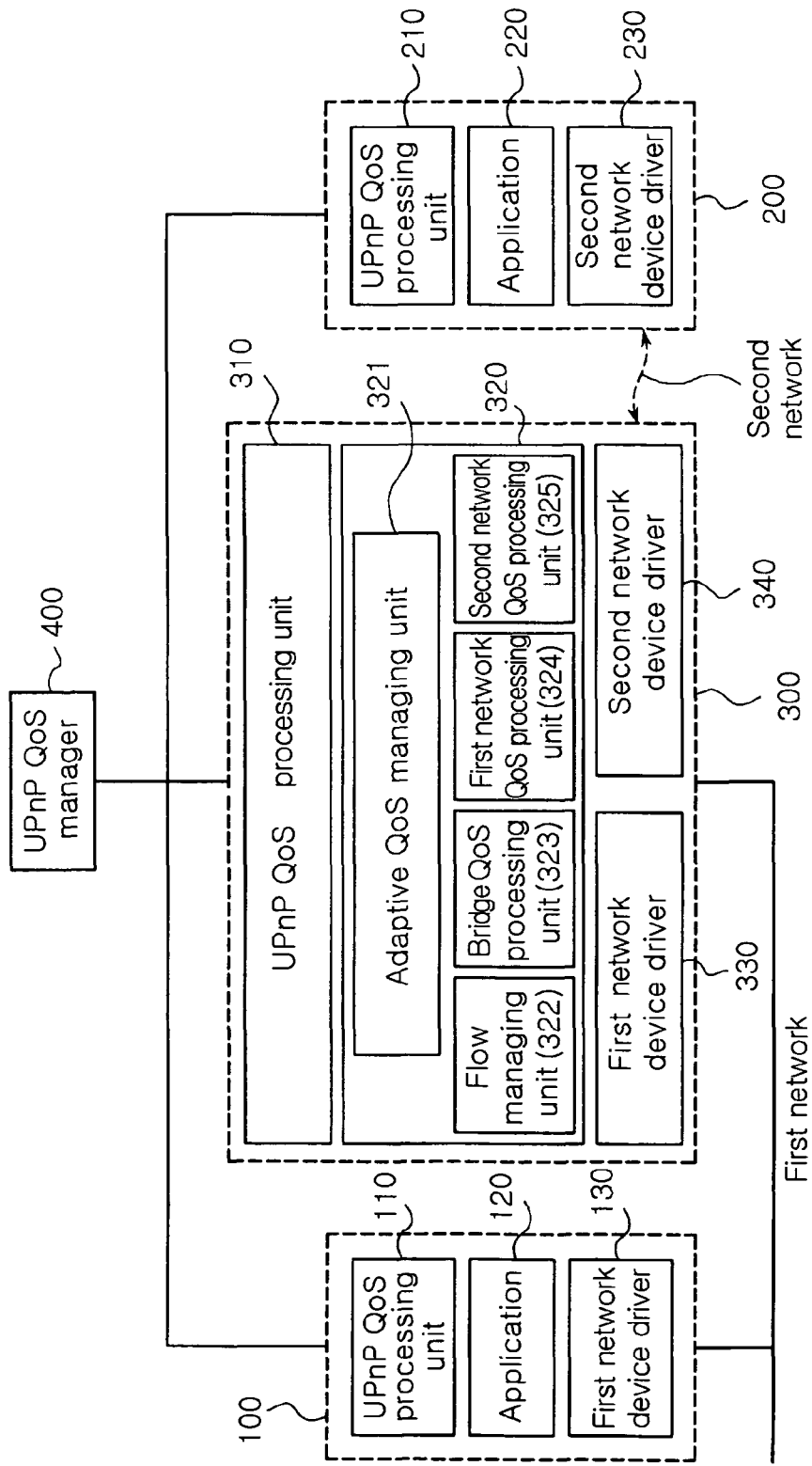
FIG. 2 is a block diagram illustrating a bridge according to an exemplary embodiment of the present invention.

FIG. 2 is a block diagram illustrating a bridge according to an exemplary embodiment of the present invention. In the exemplar embodiment shown in FIG. 2, the bridge 300 is connected to a first network that is a wired network, for example, a PLC network, and a second network that is a wireless network such as a WiNet. The first network and the second network provide different qualities of a service (QoS).

Referring to FIG. 2, the bridge 300 according to the present embodiment comprises a UPnP QoS processor 310 for collecting connection information of application services and QoS requirement information, which are provided through the first and second networks, a bridge function unit for establishing and releasing connection through allocating resources based on the collected connection information and QoS requirement information, and performing a bridging function based on connection information of a received frame, and first and second network device drivers 330 and 340 for providing data received from a corresponding network to the bridge function unit 320 or transmitting data transferred from the bridge function unit 320 to a corresponding network.

The UPnP QoS processor 310 is connected to an UPnP QoS manager 400 that is a controller for an UPnP QoS structure. The UPnP QoS manager 400 is commonly connected to devices 100 and 200 connected to the first and second networks having the bridge 300, and each of the devices 100 and 200 comprises an UPnP QoS processor 110 and 210 which are UPnP QoS devices to be controlled.

When applications 120 and 220 in the devices 100 and 200 request application service, the UPnP QoS manager 400 decides a path for providing a requested service, and transfers connection information and QoS information for providing the request application service to devices 100, 200 and 300 located between the decided path.

The QoS information provided from the UPnP QoS manager 400 is transferred as a traffic specification (TSpec) parameter. The TSpec parameter denotes an amount of traffic required for a predetermined service flow.

The devices 100, and 200 in the first and second networks establish and process connections to be suitable to its network based on the connection information and the QoS information such as traffic information, which are transferred from the UPnP QoS manager 400.

The bridge 300 performs a bridge function for connecting the device 100 of the first network to the device 200 of the second network.

In more detail, the bridge 300 collects connection information of all services and QoS information, which are transferred from the UPnP QoS manager 400, through the UPnP QoS processor 310 and stores the connection information and QoS information according to each service in the bridge function unit 320. Also, the bridge 300 establishes or releases the connections, differently queues the received frames, and transmits frames based on the stored information.

In order to perform such operations, the bridge function unit 320 comprises an adaptive QoS managing unit 321 for transforming the collected connection information of application services and QoS requirement information to global information that can be processed in the bridge, and controlling the bridge function unit 320 to bridge the requested application service and the QoS; a flow managing unit 322 for storing and managing connection information of each flow of service and the QoS information thereof in response to the control of the adaptive QoS managing unit 321; a bridge QoS processing unit 323 for managing resources in the bridge in response to the control of the adaptive QoS managing unit 321, allocating resources for establishing a connection, obtaining connection information of a received frame corresponding to the QoS information from the flow managing unit 322, and providing QoS according to the obtained information to the QoS processing unit 323; and first and second network QoS processor for monitoring QoS setting and link states in each of the first and second networks.

Hereinafter, the constitutional elements of the bridge function unit 320 will be described in detail with reference to FIG. 3 to FIG. 6.

Figure 3:
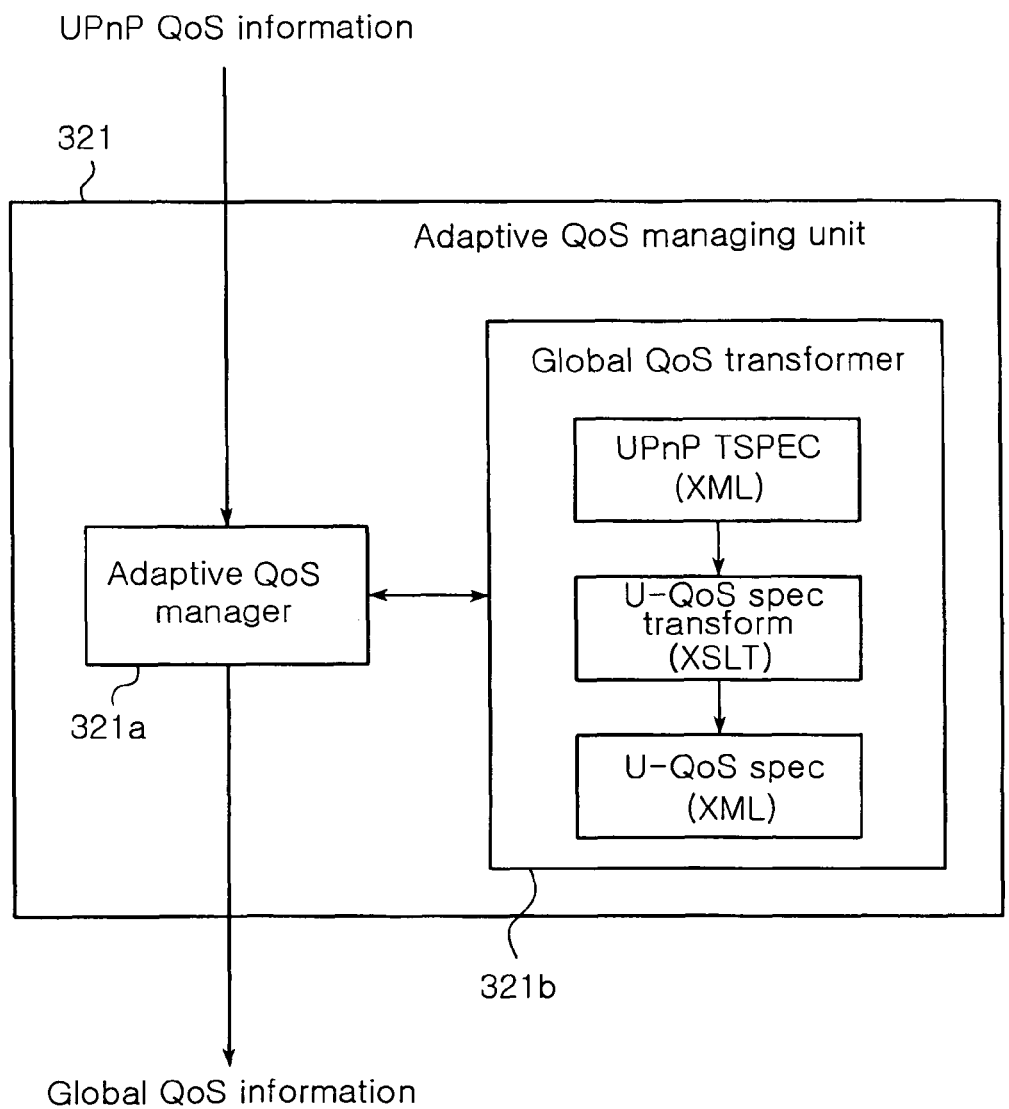
FIG. 3 is a block diagram illustrating an adaptive QoS manager of a bridge according to an exemplary embodiment of the present invention.

FIG. 3 is a block diagram illustrating the adaptive QoS manager 321 in the bridge according to an exemplary embodiment of the present invention.

Referring to FIG. 3, the adaptive QoS managing unit 321 comprises an adaptive QoS manager 321a and a global QoS transformer 321b.

The adaptive QoS manager 321a receives connection information and QoS information for requested application service on the first and second networks through the UPnP QoS processing unit 310.

As described above, the TSpec, which is QoS information used in a general UPnP QoS structure, is not used in other network system. Therefore, it requires the TSpec to transform to global format to be independent from networks and application programs and to be used in all systems.

In order to transform the TSpec, the adaptive QoS manager 321a transfers the received TSpec information to the global QoS transformer 321b for transforming the received TSpec to a global format to be used in all systems. The global QoS transformer 321b transfers the TSpec parameter of the UPnP to a global format such as XML through a global QoS transform function.

The adaptive QoS manager 321a transfers the transformed global QoS information and connection information of each service to lower systems such as the flow manager 323, the bridge QoS processor 323, and the first and second network QoS processors 324 and 325. The adaptive QoS manager 321a receives the result of establishing and releasing the connections and the link monitoring information of the first and second networks from the lower systems, and decides to allocate or release the resources. The function of the adaptive QoS function will be described with other lower systems in more detail.

Figure 4:
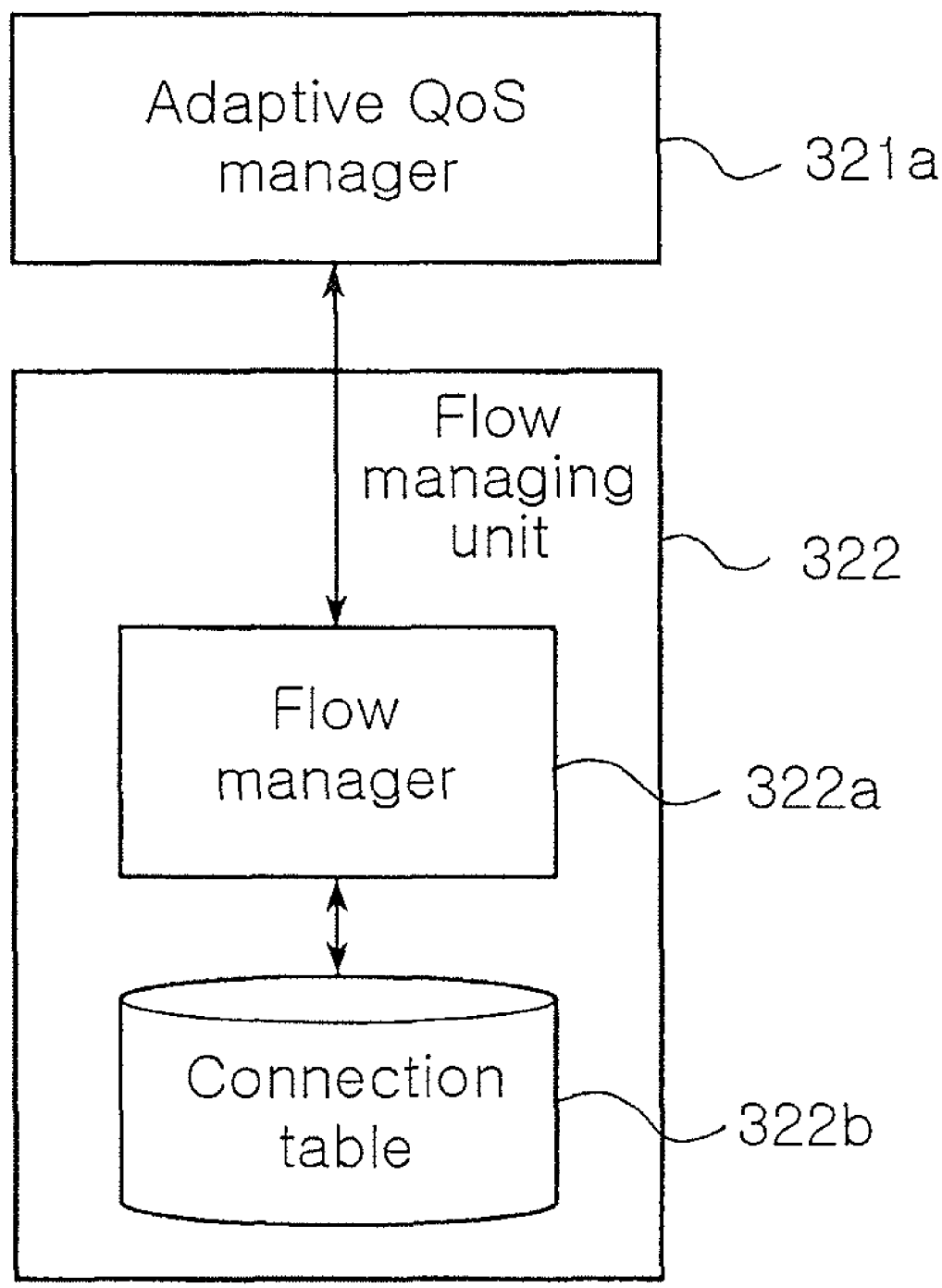
FIG. 4 is a block diagram illustrating a flow managing unit of a bridge according to an embodiment of the present invention.

FIG. 4 is a block diagram illustrating a flow managing unit 322 for managing a second layer address for bridging and connection information in each network in a bridge according to an embodiment of the present invention.

Referring to FIG. 4, the flow managing unit 322 uses a connection table 322 to manage the MAC address of all devices 10 and 200 connected to the first and second networks, and all connections in each network.

In order to manage them, the flow managing unit 322 comprises a flow manager 322a defines correlation by connecting the connection information of each service from the adaptive QoS manager 321a and the connection information of each network established by the bridge QoS processing unit 323 and the first and second network QoS processing unit 324 and 325.

The defined information in the connection table 322b is provided as bridge information according to the registered connection information corresponding to a received frame when the frame is received and when the request for the connection information of the received frame is received.

The connection table 322b may comprise one or more tables.

Figure 5:
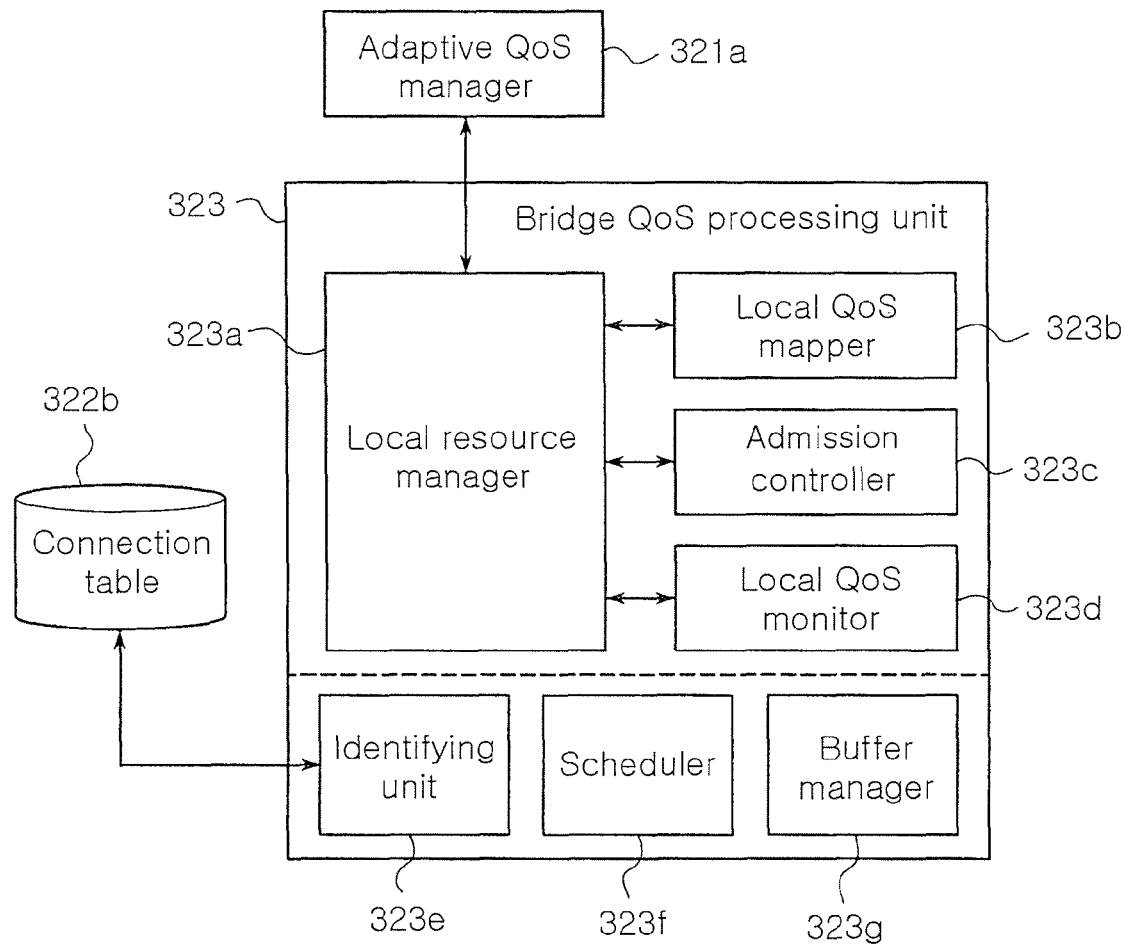
FIG. 5 is a block diagram illustrating a bridge QoS processing unit of a bridge according to an embodiment of the present invention.

FIG. 5 is a block diagram illustrating a bridge QoS processing unit 323 for allocating resources in a bridge and providing QoS in a bridge according to an embodiment of the present invention.

Referring FIG. 5, the bridge QoS processing unit 323 comprises a local resource manager 323a, a local QoS mapper 323b, an admission controller 323c, a local QoS monitor 323d, an identifying unit 323e, a scheduler 323f, and a buffer manager 323g.

The detailed structure of the bridge QoS processing unit 323 can be divided into a control block for setting up QoS information and controlling constitutional elements of the bridge, and a data block for processing the received data. In more detail, the control block of the bridge QoS processing unit 323 comprises the local resource manager 323a, the local QoS mapper 323b, the admission controller 323c, the local QoS monitor 323d, and the data block comprises the identifying unit 323e, the scheduler 323f, and the buffer manager 323g.

The local resource manager 323a receives the connection information and the global QoS information thereof, which are transferred from the adaptive QoS manager 321a. The local resource manager 322a transforms the global QoS information provided through the local QoS mapper 323b to local QoS information required in the bridge QoS processing unit 323.

The local resource manager 323a inquiries the admission controller 323c whether a request QoS can be provided or not based on the transformed local QoS information. The admission controller 323c determines whether the requested QoS can be provided or not. In more detail, the admission controller 323c calculates the amount of resources for guaranteeing the request QoS based on the global QoS information, compares the calculated amount of the resources and available resources in the bridge, and determines whether the requested QoS can be provided or not.

If the requested QoS can be provided, the local resource manager 323a allocates resources required for providing QoS of a corresponding service to the data block such as the identifying unit 323e, the scheduler 323f and the buffer manager 323g, and requests them to process the allocated resources.

On the contrary, if the admission controller 323c determines that the requested QoS cannot be provided, the local resource manager 323a checks the currently provided QoS through the local QoS monitor 323d, and transfers modified QoS information, TSpec parameter, for providing the request service to the adaptive QoS managing unit 321. The adaptive QoS managing unit 321 decides to approve the modified QoS information, and returns it to the local resource manager 323a. If the modifying request is approved, the local resource manager 323a request allocation and process the modified resource.

When data frame is received, the data block receiving and requested to process the resources of services extracts the connection information of the received frame from the identifying unit 323a. Based on the extracted connection information, the data block searches the connection table 322b of the flow managing unit 322 and selects one of the first and second networks for the corresponding service connection with an output interface. That is, the data block selects one of connections in the first or the second networks. The connection information extracted from the identifying unit 323e comprises at least one of a MAC address, an IP address, a port number, a protocol number, priority information, and an interface number, combination of connection information in the first or the second networks.

Based on the selected interface and connection information from the identifying unit 323e, the scheduler 323f queues frames in an output buffer that provides a proper QoS to the selected connection, and the buffer manager 323g sequentially reads and transmits the data frames in each output buffer through a device driver.

Figure 6:
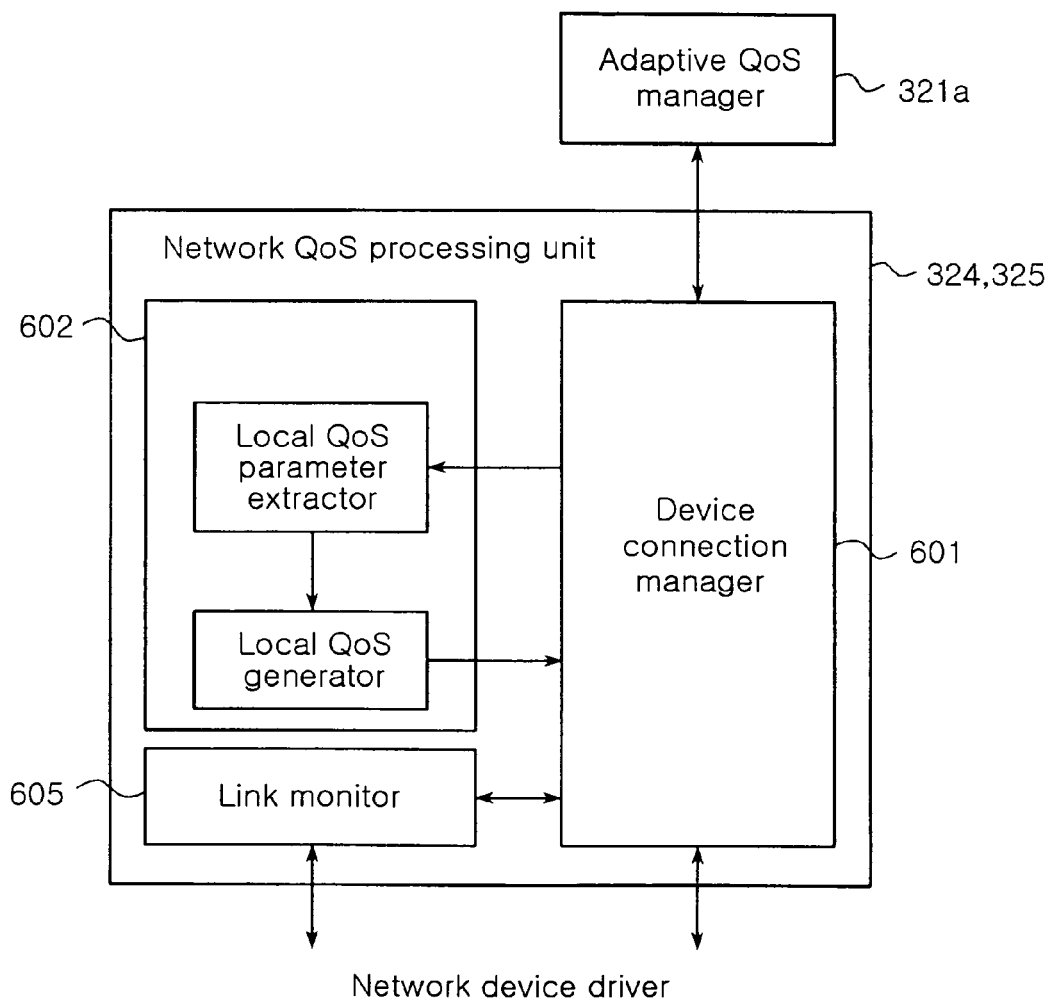
FIG. 6 is a block diagram illustrating first and second network QoS processing units of a bridge according to an exemplary embodiment of the present invention.

FIG. 6 is a block diagram illustrating first and second network QoS processing units 324 and 325 in a bridge according to an exemplary embodiment of the present invention. Referring to FIG. 6, the first and second network QoS processing unit 600 comprises a device connection manager 601, a device QoS mapper 602, and a link monitor 605.

The first and second network QoS processing unit 324 and 325 provide QoS managing function to each of the first and second networks. The device connection manager 601 receives the connection information of each service and the global QoS information from the adaptive QoS manager 321a, and transforms the received global QoS information to QoS information to be used in a corresponding network, that is, the first network or the second network, through the device QoS mapper 602. Using the connection information of each service and the modified QoS information, the device connection manager 601 requests corresponding network device driver 330 or 340 to establish a QoS connection for each service flow or to release the QoS connection. Also, the device connection manager 601 receives the result of establishing and releasing and transfers the received result to the adaptive QoS manager 321a. The adaptive QoS manager 321a can confirm whether the requested service connection is established or not based on the received result. The confirmed connection information of the network device driver is transferred and stored to the flow manager 322.

Furthermore, the first and second network QoS processing units 324 and 325 monitor the QoS state and the link state of all connections established in each corresponding network through the link monitor 605. Such monitoring information is regularly or occasionally transferred to the adaptive QoS manager 321*a* through the device connection manager 601. Herein, the monitoring cycle can vary according to the network state or the QoS state. The adaptive QoS manager 321*a* monitors the QoS state of each service and performs the QoS adaptation using the monitoring information. Also, the adaptive QoS manager 321*a* transfers the state information of the requested service to the UPnP QoS managing unit 400.

As described above, the bridge according to certain embodiments of the present invention obtains connection information through an UPnP QoS structure when connecting networks supporting different QoS, controls and manages QoS of resources in the bridge based on the obtained QoS information, and adaptively manages resources and connections according to the QoS characteristics of each network. Therefore, the heterogeneity problem between networks can be solved.

While the present invention has been shown and described in connection with the preferred embodiments, it will be apparent to those skilled in the art that modifications and variations can be made without departing from the spirit and scope of the invention as defined by the appended claims.

What is claimed is:

1. A bridge for heterogeneous QoS networks comprising:
   a UPnP QoS processing unit for collecting connection information connected through the networks and QoS requirement information thereof through an UPnP (Universal Plug and Play) QoS (Quality of service) structure;
   a bridge function unit for establishing and releasing connection by allocating resources based on the collected connection information and QoS requirement information, and performing a bridging operation according to connection information of a received frame;
   at least two of network device drivers physically connected to the networks for receiving data from a corresponding network and transferring the received data to the bridge function unit, or transmitting data from the bridge function unit to a corresponding network;
   wherein the bridge function unit comprises:
      an adaptive QoS managing unit for transforming the collected connection information of application service and the QoS requirement information thereof to global information to be processed in the bridge, and controlling the bridge function unit to perform a bridging operation for a requested application service and a QoS thereof;
      a flow managing unit for storing connection information of each flow of application service established in each network and QoS information of a corresponding connection;
      a bridge QoS processing unit for managing resources of the bridge in response to the control of the adaptive QoS manager, allocating resources required for establishing a connection, obtaining QoS information corresponding to connection information of a received frame, and providing a QoS based on the QoS information; and
      at least two of network QoS processing unit for establishing a QoS of each network and monitoring a link state.

2. The bridge according to claim 1, wherein adaptive QoS managing unit comprises:
   a global QoS transformer for transforming the collected QoS information of each service from the UPnP QoS processing unit to global QoS information; and
   an adaptive QoS manager for providing the global QoS information and the connection information of each service to the flow managing unit, the bridge QoS processing unit, and the network QoS processing units, and requesting the flow managing unit, the bridge QoS processing unit, and the network QoS processing units to establish a connection and process a QoS thereof.

3. The bridge according to claim 1, wherein the flow managing unit comprises:
   a flow manager for correlating connection information of each service transferred at the adaptive QoS managing unit and established connection information and MAC addresses of devices connected to each network; and
   a connection table storing the correlated connection information and the established connection information and a MAC address of devices connected to each network from the flow manager.

4. The bridge according to claim 1, wherein the bridge QoS processing unit comprises:
   an identifying unit for selecting connection registered corresponding to a received frame and an output interface with reference to information stored in the flow managing unit by extracting connection information from the receiving frame;
   a scheduler for controlling a transmission schedule of a received frame according to a QoS of the selected connection from the identifying unit;
   a buffer manager for reading the received frame in response to the control of the scheduler and transmitting the read frame through the network device driver;
   a local QoS mapper for transforming the global QoS information from the adaptive QoS manager to local QoS information;
   an admission controller for approving whether the request QoS is provided or not;
   a local QoS monitor for monitoring a local QoS state; and
   a local resource manager for obtaining QoS information locally required corresponding to the global QoS information through the local QoS mapper and the admission controller, determining whether it is possible to provide the QoS based on the obtained QoS information, and requesting the identifying unit, the scheduler and the buffer manager to allocate resources corresponding to the request QoS and to process the QoS if the request QoS is provided.

5. The bridge according to claim 1, wherein each of at least two of network QoS processing units comprises:
   a device QoS mapper for transforming a global QoS of the adaptive QoS managing unit to a device QoS to be suitable to a corresponding network;
   a link monitor for monitoring link states of all connections established in a corresponding network; and
   a device connection manager for requesting a corresponding network device to establish or to release a QoS connection for each service flow using connection information of each service provided from the adaptive QoS managing unit and the transformed QoS information, and providing the monitored state value of the link monitor to the adaptive QoS managing unit.

* * * * *